(12) United States Patent
Van Den Bosch et al.

(10) Patent No.: US 7,044,495 B2
(45) Date of Patent: May 16, 2006

(54) HITCH ASSEMBLY

(75) Inventors: Bryan Van Den Bosch, deceased, late of Alliston (CA); by Rozina Van Den Bosch, legal representative, Priceville (CA); Bryan Jennings, Orangeville (CA)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/923,383

(22) Filed: Aug. 20, 2004

(65) Prior Publication Data

US 2005/0146117 A1    Jul. 7, 2005

Related U.S. Application Data

(60) Provisional application No. 60/498,921, filed on Aug. 29, 2003.

(51) Int. Cl.
*B60D 1/02* (2006.01)

(52) U.S. Cl. .................................. 280/515; 403/79
(58) Field of Classification Search .............. 280/504, 280/515; 403/79, 161
See application file for complete search history.

(56) References Cited

U.S. PATENT DOCUMENTS

| | | | |
|---|---|---|---|
| 2,459,245 A * | 1/1949 | Seward | 280/515 |
| 2,470,531 A * | 5/1949 | Suhl et al. | 280/515 |
| 2,475,761 A * | 7/1949 | Shook | 280/515 |
| 2,548,259 A | 4/1951 | Hall | |
| 2,685,456 A * | 8/1954 | Black | 280/478.1 |
| 2,757,020 A | 7/1956 | Grelind | |
| 2,935,331 A | 5/1960 | Ledgerwod | |
| 2,945,281 A * | 7/1960 | Wilkirson | 27/17 |
| 3,326,575 A * | 6/1967 | Shepley | 280/515 |
| 4,144,655 A | 3/1979 | Harris | |
| 5,083,808 A | 1/1992 | Torii | |
| 5,261,687 A | 11/1993 | Bergman | |
| 6,415,475 B1 | 7/2002 | Dixon | |
| 6,520,514 B1 | 2/2003 | Clegg | |
| 2002/0105164 A1 | 8/2002 | Hobdy et al. | |
| 2004/0251660 A1 * | 12/2004 | Roe et al. | 280/515 |

FOREIGN PATENT DOCUMENTS

FR    2678214 A1 * 12/1992

* cited by examiner

*Primary Examiner*—Kevin Hurley
(74) *Attorney, Agent, or Firm*—Rankin, Hill, Porter & Clark LLP

(57) ABSTRACT

Disclosed herein is a hitch assembly for a vehicle, comprising a support portion, an engaging pin and an actuating portion movably mounted in the support portion along spaced substantially parallel axes, the engaging pin being movable between disengaged and engaged positions, wherein in the engaged position, the engaging pin is operable to engage a passage in a tongue on an adjacent article.

31 Claims, 10 Drawing Sheets

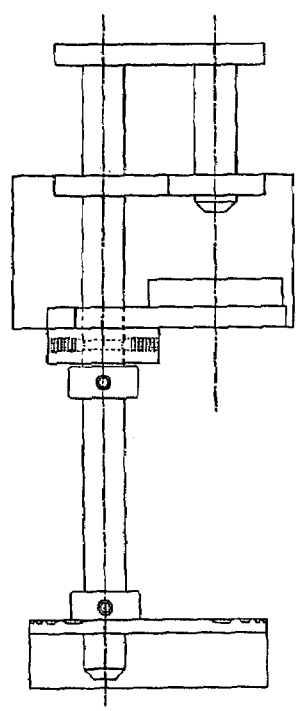
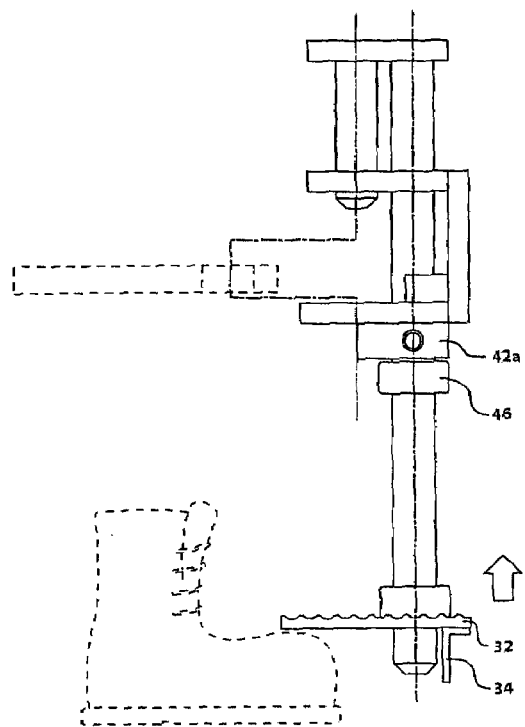
FIG. 2
FIG. 3

HITCH ASSEMBLY

BACKGROUND OF THE INVENTION

1. Field of the Invention

The present invention relates to hitch assemblies and more particularly but not necessarily exclusively to hitch assemblies and methods for joining transport vehicles together.

2. Description of the Related Art

Manufacturing facilities require efficient transportation systems for transporting parts, materials and finished goods in various configurations from one station to another. Transportation carts are commonly used for this purpose. Often these carts are joined together in trains by way of a hitch and hitch pin arrangement. One cart has a tongue with a passage near its free end which is then mated with a yoke on a leading cart and the tongue and yoke are then engaged by a hitch pin fitting through a pair of passages on the yoke, on opposite sides of the tongue, together with the passage in the tongue. However, doing so requires that a user bend down and place the pin in position in the aligned passages. However, this often requires the passages to be aligned first and then the pin inserted thereafter, both steps being done while the user is bent over, presenting a serious risk of personal injury as a result.

It is an object of the present invention to provide a novel hitch assembly.

SUMMARY OF THE INVENTION

In one of its aspects, the present invention involves a hitch assembly for joining one article with another, comprising a support portion for attachment to one article, an engaging pin and an actuating portion movably mounted in the support portion along spaced substantially parallel axes, the engaging pin being movable between disengaged and engaged positions, wherein in the engaged position, the engaging pin is operable to engage a passage in a tongue on the other article.

Preferably, one or more of the articles is a vehicle. More preferably, the hitch assembly is operable to join a pair of vehicles.

In one embodiment, the support portion includes a support plate and the parallel axes are spaced from the support plate in "side-by-side" relation. This has the effect of laterally spacing the actuating portion from the engaging pin relative to a longitudinal axis of the vehicle. However, the axes may also be aligned along a path perpendicular (that is "front-to-back") relative to the support plate. Desirably, in one example, the engaging pin is laterally spaced from and in front of the actuating portion to maximize the amount of rotational travel (or sweep) for a tongue when engaged with the engaging pin. The front to back alignment maximizes rotational travel but will increase the outer profile of the hitch. However, rotational travel may also be increased by increasing the side-to-side spacing.

In one embodiment, the actuating portion includes an elongate member which, together with the engaging pin, is slidably mounted in the support portion. In this case, the support portion has a pair of spaced plate members each with a pair of corresponding passages. The passages in the two plate members line up so that the engaging pin and the elongate member are slidably mounted in one passage in each plate member.

Alternatively, more than one actuating portion may be beneficial in some cases. For example, it may be useful to have two or more actuating members which travel along their own axes in passages in the adjacent plate members. Though the plate members are particularly convenient, they may also be replaced by other means of supporting the actuating member and engaging pin between their engaged and disengaged positions. Each of these actuating members or engaging pin may include a locking mechanism.

Preferably, the actuating portion further comprises a user-engaging formation to permit the user to operate the hitch assembly. The user-engaging portion may be "foot-operated" and, as such, may be located adjacent a ground surface for allowing foot-engaged contact by the user. In this case, the user-engaging formation may include such things as a pad mounted on the lower end of the elongate member. Alternatively, the user-engaging formation may be located at a location other than adjacent a ground surface to provide for engagement with another part of the user's body, such as a hand, arm, hip or the like.

Preferably, the assembly is provided with a locking arrangement for releasably locking one or both of the actuating portion and the actuating pin in the disengaged and/or engaged positions. The lock may, if desired, be of the type which includes one or more latch formations on the support portion (or actuating portion) for engaging one or more recess formations in the actuating portion (or support portion). In one embodiment, the locking arrangement includes a sleeve mounted on the support portion and slidably engaged with an outer surface of the actuating portion, wherein the latching formation includes a pair of opposed spring-biased ball assemblies and the recess formation is a groove on the actuating portion. In this case, the engaging pin is biased towards the engaging position. The engaging pin may thus be biased by gravity and/or a spring or some other bias generating means. However, other arrangements are also contemplated as are described herein below.

In yet another of its aspects, the present invention provides a hitch assembly comprising a hitch pin for a mated coupling with a tongue; an actuating portion for adjusting the pin between disengaged and engaged positions with the tongue; and support means for supporting the hitch pin and the actuating portion for movement of the hitch pin and actuation portion along respective spaced substantially parallel axes.

In yet another of its aspects, the present invention provides transport vehicle, comprising an undercarriage capable of transporting articles from one location to another and equipped with a hitch assembly capable of joining the undercarriage with an adjacent vehicle, the hitch assembly comprising a support portion mounted on the undercarriage, an engaging pin and an actuating portion movably mounted in the support portion along spaced substantially parallel axes, the engaging pin being movable between disengaged and engaged positions, wherein in the engaged position, the engaging pin is operable to engage a passage in a tongue on the adjacent towed vehicle.

In yet another of its aspects, there is provided a method of attaching a vehicle to an adjacent article, comprising:
 a step for providing a support portion on the vehicle,
 a step for supporting on the support portion, an engaging pin for engaging the article;
 a step for movably mounting on the support portion, an actuating portion for actuating the engaging pin between engaged and disengaged positions;
 a step for providing each of the actuating portion and engaging portion with an axis, and orienting the axes to be spaced and substantially parallel; and wherein in the engaged position, the engaging pin is operable to engage a passage in a tongue on the article.

In yet another of its aspects, there is provided a hitch assembly for a vehicle, comprising a support means, an engaging pin means and an actuating means movably mounted in the support portion along spaced substantially parallel axes, the engaging pin means being movable between disengaged and engaged positions, wherein in the engaged position, the engaging pin means is operable to engage a passage in a tongue means on an adjacent article.

BRIEF DESCRIPTION OF THE DRAWINGS

Several preferred embodiments of the present invention will now be described, by way of example only, with reference to the appended drawings in which:

FIG. 2 is a front view of the hitch assembly of FIG. 1;

FIG. 3 is a side view of the hitch assembly of FIG. 1;

DESCRIPTION OF THE PREFERRED EMBODIMENTS

Figure 1:
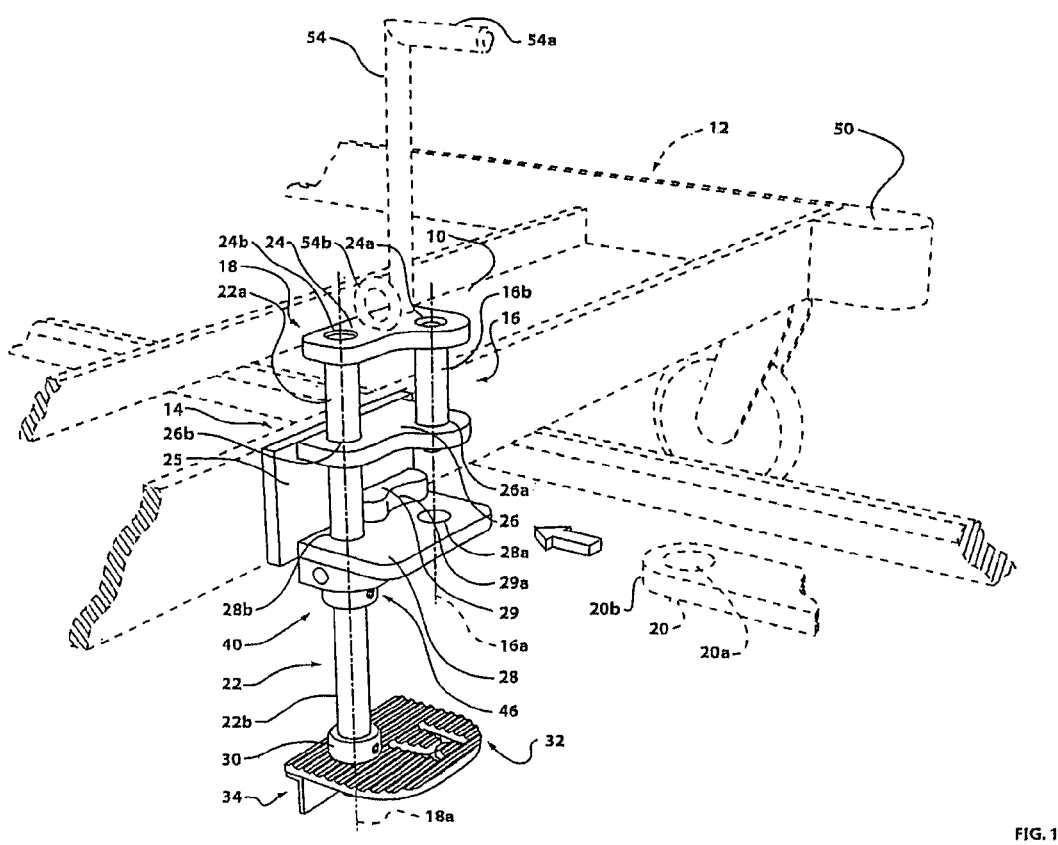
FIG. 1 is a perspective view of a hitch assembly for a vehicle and in a disengaged position.
Figure 4:
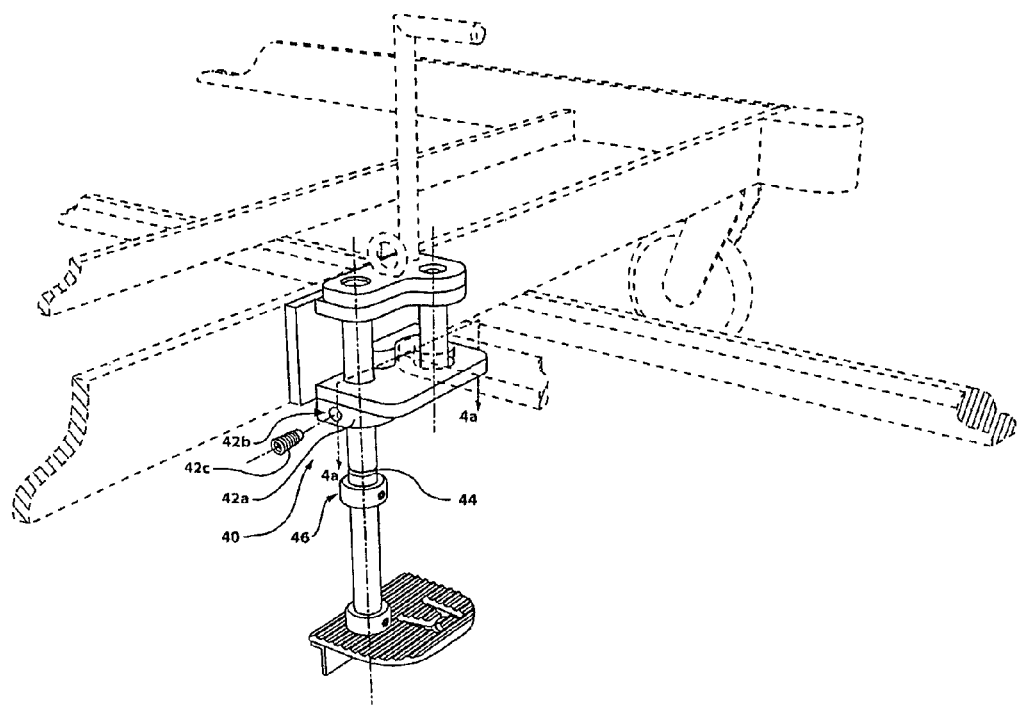
FIG. 4 is a perspective view of the hitch assembly of FIG. 1 in an engaged position.

The figures show a hitch assembly, shown in solid lines in FIG. 1 at 10 for a vehicle shown generally in dashed lines at 12 in FIG. 1. The hitch assembly includes support portion 14, an engaging pin 16 and an actuating portion 18 movably mounted in the support portion along spaced substantially parallel axes shown at 16a and 18a respectively. As will be described, the engaging pin is movable between a "disengaged" position as shown in FIG. 1 and an engaged position as shown in FIG. 4. It is in the engaged position that the engaging pin is operable to engage a passage 20a in a tongue (or some other portion with a passage or other formation and capable of being coupled with the hitch assembly 10) shown at dashed lines at 20 on an adjacent vehicle or some other article. As will be described, the actuating portion 18 enables a user to transfer the pin between its disengaged and engaged positions.

In one embodiment, the actuating portion includes an elongate member 22 in the form of a cylindrical rod member, which is joined in spaced parallel relationship with the actuating pin 16 by way of joining member 24. The latter has passages 24a and 24b to receive a corresponding upper end 16b of the pin 16 and the upper end 22a of the rod member 22. The support portion 14 includes a support plate 25, and upper and lower plate members 26, 28 each with a pair of corresponding passages 26a, 26b and 28a, 28b, respectively, wherein each passage in one plate member aligns with a passage in the other plate member. The engaging pin 16 thus slidably extends through passages 26a, 28a and the rod member through passages 26b, 28b in the plate members. The engaging pin and the elongate member are thus slidably mounted in corresponding passages in the support portion.

Mounted adjacent the support plate 25 is a tongue guide member 29 having a depression 29a in its tongue-facing surface which is aligned with and located behind the passage 28a. The tongue guide member 29 serves as a locating means for locating the tongue 20 to align its passage 20a with the passage 28a, reducing the need for manual adjustment by the user. Of course, the tongue guide may be provided in other ways. It may have a depression of other shapes, such as by way of a v-shaped notch or the like. The tongue 20 has a curved leading edge 20b which is dimensioned to be complementary with the depression 29a. The tongue guide member may be, in some cases, formed of a resilient outer liner layer in the depression 29a or be made entirely from a resilient, in either case to reduce the effects of impact between the tongue 20 and the tongue guide member 29, which may be detrimental in some cases. It will be understood, however, that while the tongue guide member is beneficial, it is not essential to the successful functioning of the hitch assembly 10.

Preferably, the actuating portion further comprises a user-engaging formation, which may be located adjacent a ground surface for allowing foot-engaged contact by the user. In this case, the rod member has a lower end region 22b which carries a sleeve 30 which itself supports a pad 32 extending outwardly from the rod member adjacent a ground surface. The pad has an upper surface which is contoured to provide a plurality of ridges to provide an enhanced grip with the tread of a user's foot wear. However, the upper surface of the pad may be provided with other enhanced gripping surfaces, such as by way of coarse grip sanding paper type layers and the like. The pad may, however, not have an enhanced gripping surface but may simply provide a normal finish of plate steel, for example.

Located beneath the pad 32 is a kick plate 34 which is desirably spaced from the free edge of the pad 32 to allow the user to place the toe section of his boot or other footwear beneath the pad 32 a sufficient depth for exerting an upward force on the pad to actuate the assembly. In order to maintain good ergonomic function, when the user's boot is in contact with the kick plate 34, the pad should not significantly overlap the boot that it extends beyond a toe region in the boot, namely the region of the boot which is toe box is typically protected with a protective cap. If, in this position, the pad overlaps the boot beyond the toe region, the user is advised to provide supplementary foot protection to the top of the boot beyond the toe cap. In any event, the degree to which the pad does overlap the toe of the boot otherwise should have relatively little impact on the function of the hitch assembly 10.

Referring to FIG. 4, the assembly has a locking arrangement generally shown at 40 for releasably locking one or both of the actuating portion and the actuating pin in the disengaged position. The lock includes a latch formation in the form of a pair of opposed spring loaded ball assemblies having a ring housing 42a with a pair of passages 42b, each containing a ball spring arrangement 42c, which lock within a recess formation, in the form of the groove 44, on the rod member 22. The recess and balls are arranged to engage when the actuating pin is in the disengaged position of FIG. 1. Of course, the ball spring arrangements 42c may be replaced by a number of other locking arrangements, such as by the use of pins, rings and other engaging members of metallic or nonmetallic materials, such as stainless steel, nylon, other plastics or the like. The lock may involve other mechanisms by the use of gears and gear teeth, magnets and the like. While the actuating portion is shown in the illustrations as carrying the locking mechanism, it will be understood that the locking mechanism may instead be installed on the support member to engage the actuating pin. Alternatively, the locking mechanism may be separate from both the actuation portion and the engaging pin, but still maintain the engaging in the disengaged potion, for example, by maintaining the joining member at the disengaged position relative to the support plate or the upper plate member 26.

If desired, additional locking means may be provided for removably locking the pin in the engaged position, using a range of locking means as described. However, for the purposes of the specific embodiment herein described, no locking means is used for this purpose.

The rod member 22 is also provided with a limit ring 46 to limit the travel of the rod member in the upward direction, which is defined by the contact of the limit ring 46 against the ring 42a.

As will be described, the embodiment illustrated in the figures relies on the effort of the user to bring the actuating pin to its disengaged position. However, other delivery means may be employed such as springs, pneumatic cylinders and the like may also be used to enhance the bias of the device towards the disengaged position. Similarly, the embodiment illustrated in the figures relies on the force of gravity to bring the actuating pin to its engaged position. However, other delivery means may be employed such as springs, pneumatic cylinders and the like may also be used to enhance the bias of the device towards the engaged position.

Figure 4A:
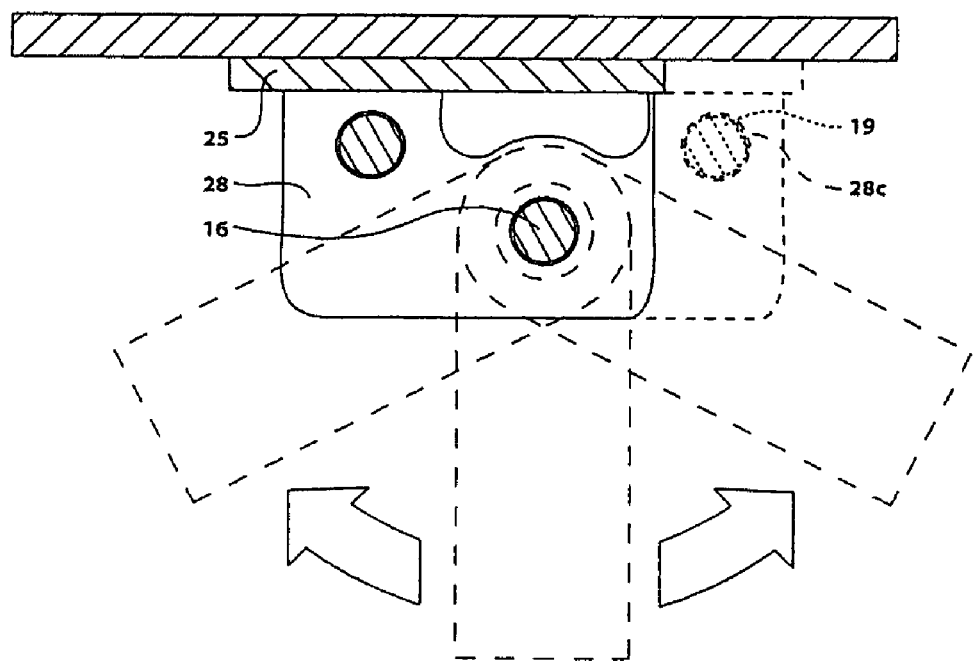
FIG. 4a is a sectional view taken on line 4a—4a of FIG. 4.

Referring to FIG. 4a, it can be seen that the engaging pin 16 and the actuating portion 18 are not equally spaced from the support plate 25. Instead, the engaging pin is a greater distance from the support plate than the actuating portion, meaning that the engaging pin is in front of the actuating portion. This is beneficial because it allows the tongue a relatively wide path of rotation when coupled with the engaging pin as shown in FIG. 4a. Yet, the depth of the assembly (as viewed in the horizontal direction of FIG. 3) is relatively shallow allowing for a "low profile" assembly which is space efficient.

Figure 7:
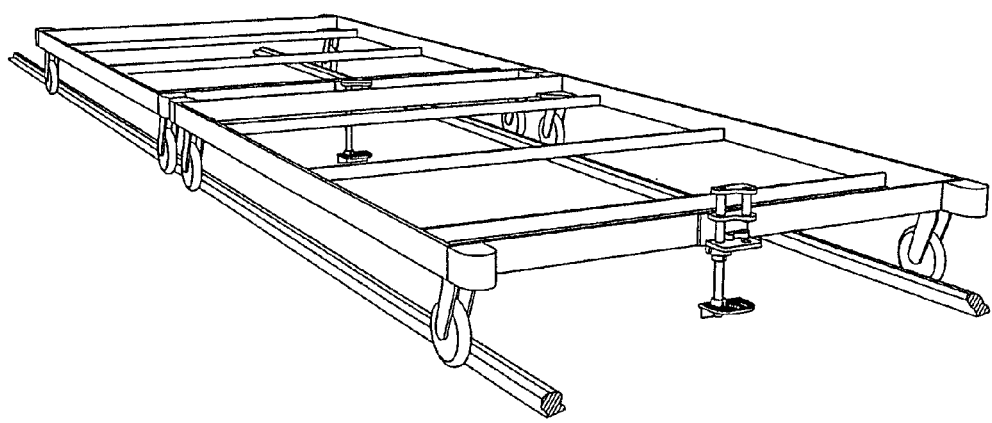
FIG. 7 is a perspective view showing vehicles equipped with a hitch assembly according to FIG. 1.
Figure 7A:
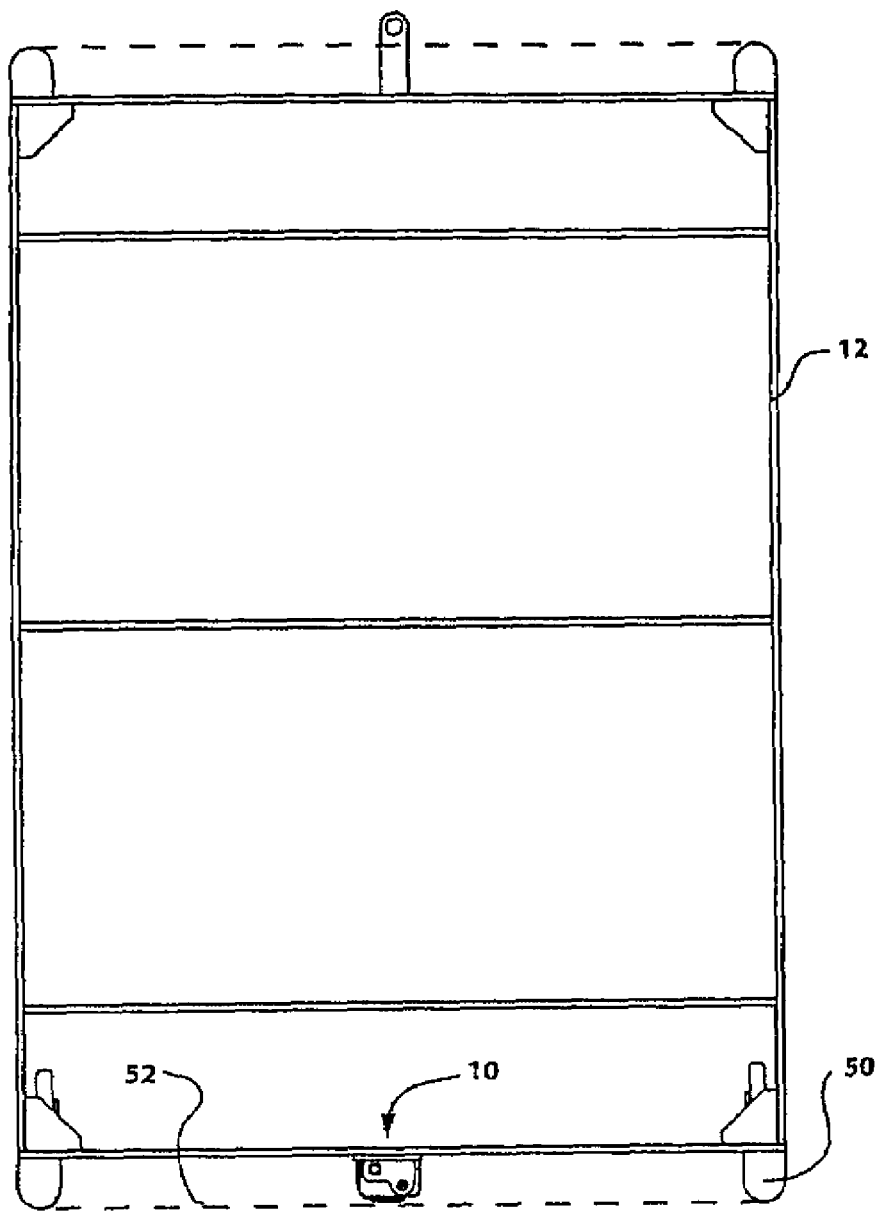
FIG. 7a is a plan view of one of the vehicles shown in FIG. 7.
Figure 8:
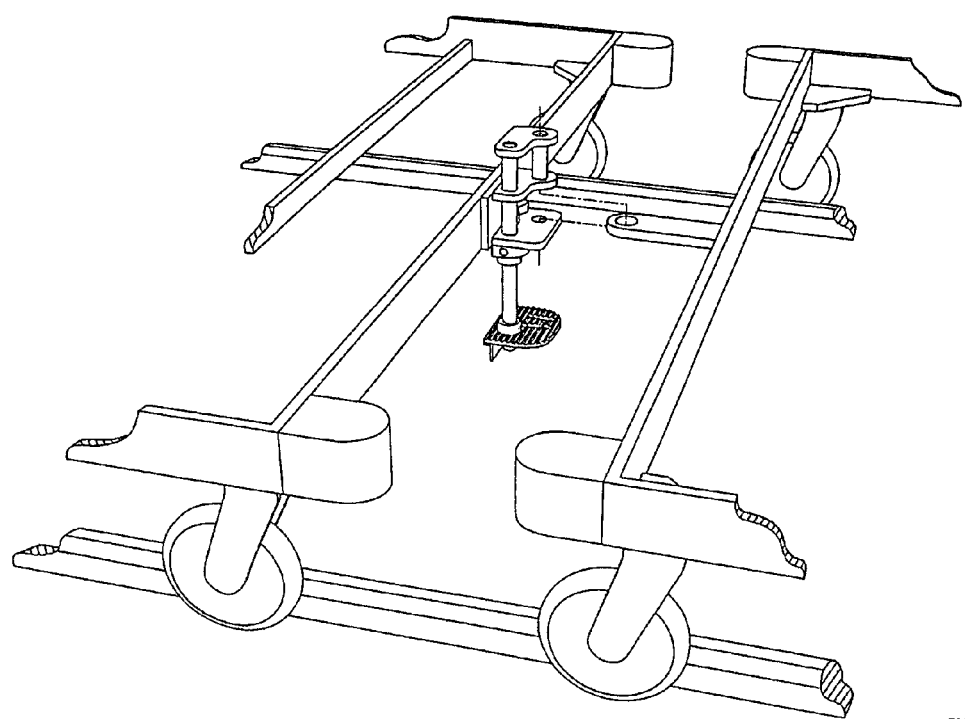
FIGS. 8 to 10 are other fragmentary perspective views of the vehicles of FIG. 7.
Figure 9:
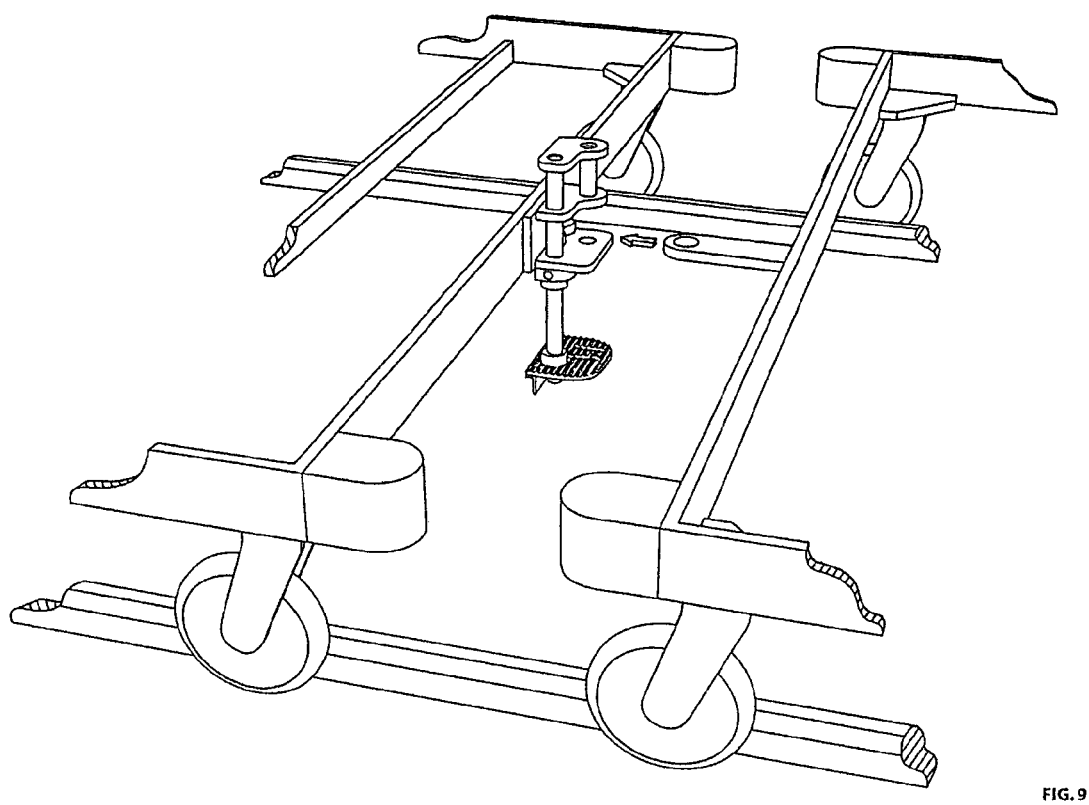
Figure 10:
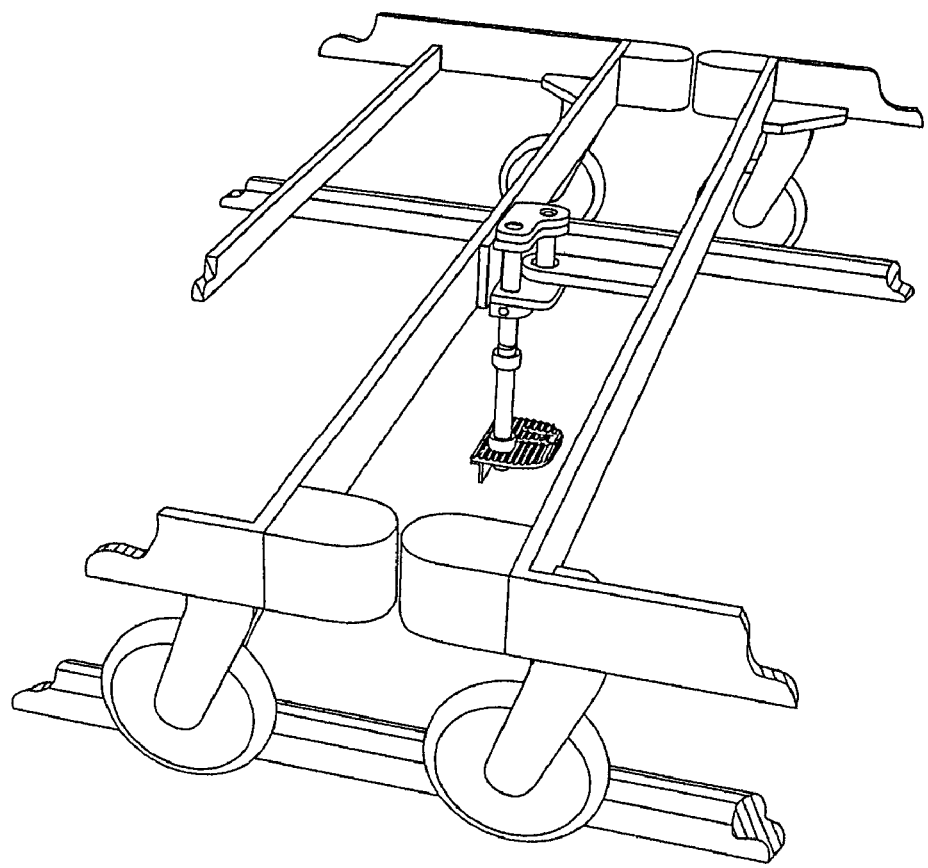

Referring to FIGS. 1 and 7a, the vehicle 12 is, in this example, a cart with an undercarriage having one or more bumpers 50 defining an outer peripheral limit shown at 52 of the undercarriage. In this case, the low profile nature of the hitch assembly allows it, in one embodiment, to be confined to a region within the peripheral limit, which has the benefit of protecting the assembly against damage to itself and other damage caused by it with other articles such as adjacent carts and the like.

While the actuating portion is shown in the figures as being a rod member extending toward a pad below the support portion, it will be understood that other means may be used to actuate the engaging pin between its engaged and disengaged positions. For instance, as shown in FIG. 1, the plate member 24 may be provided with an upwardly directed member 54 which my be dimensioned to provide a handle portion 54a at an elevation convenient to the user, so that the upper plate member, and hence the engaging pin, may be actuated. In this instance, it is contemplated that the parallel axis relationship between the engaging portion and the actuating pin be retained and it is further contemplated that the engaging portion, would be provided by a shortened version of the rod 22 which would not extend substantially below the lower plate 28, except perhaps to hold a limit unit to limit travel of the engaging portion, such as the locking ring 46. Also shown, as yet another alternative, is an anchor ring 54b secured to the joiner member 24 to receive a user-held hook member or the like.

However, leaving the joining member flat (and defining, in this example, the uppermost portion of the hitch assembly) provides a number of benefits. The hitch assembly may, if desired, be arranged so that the joiner member 24, in its engaged position, or possibly also in its disengaged position, remains near or below the payload-carrying support surface elevation of the cart. This means that the hitch assembly mechanism will not be as prone to damage caused by the loading of the cart of its payload either manually by the user or by a forklift truck or other loading mechanism, or as a result of collisions that might otherwise occur between the hitch assembly components above the joining member and other objects while the cart is being used. In addition, the hitch assembly may not be as prone to become a source of damage to the payload or other equipment by potential contact, for example, of the handle 52b and with the payload or other equipment. The hitch assembly is also arranged so that this default position is in the engaged position which is beneficial in cases where there may be a collision between the hitch assembly and some other object. Provided that collision includes at least some significant downward force, the hitch assembly should move to its lower engaged position.

The plate 28 also provides protection to the hitch assembly by being of slightly larger than the joining member 24 and 26. In addition, the joining member 24 and the plate 26 are of common shape and provide a visible projection in the region of the engaging pin. This provides a strong visual cue to the user so that the use can easily align the engaging pin, directly below this projection with the passage in the tongue or equivalent member. In addition, when the hitch assembly is in its disengaged position, these projections in the joining member and the plate 26 are spaced from one another providing a further depth of field cue to the user to aid in the alignment process.

Figure 5:
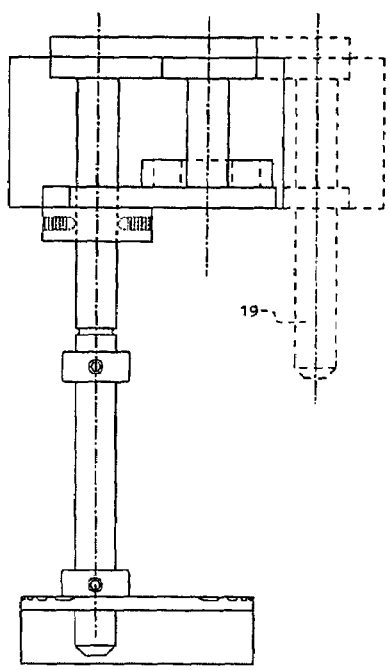
FIG. 5 is a front view of the hitch assembly of FIG. 4.
Figure 6:
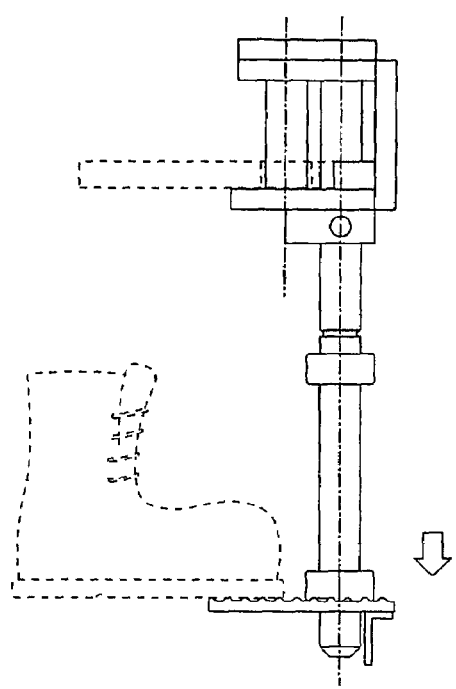
FIG. 6 is a side view of the hitch assembly of FIG. 4.

While the hitch assembly 10 is provided with a single actuating portion 18, it will be understood that more than one actuating portion may be used, as shown in FIG. 4a. In this case, the lower support plate 28 is shown in dashed lines as extending to the right of the passage 28a and containing an additional passage 28c for the passage of a second actuating portion 19 there through, which is also shown in dashed lines in FIG. 5.

The hitch assembly 10 is used as follows. First, it is installed on a vehicle such as the cart 12 and is placed in the disengaged position as shown in FIG. 1. As shown in FIG. 3, to do this, the user places his foot beneath the pad 32 until making contact with the kick plate 34, at which point the user exerts an upward force on the pad 32 to displace the rod upwardly, causing the ring 46 to approach the housing 42a of the locking arrangement mechanism 42. As the ring 46 makes contact with the housing 42a, the groove 44 and the ball of the locking arrangement 42 engages the groove 44 to lock the assembly in the disengaged position. The vehicle 12 may then be oriented with an adjacent vehicle or another article containing a tongue 20 or equivalent portion. The tongue is positioned relative to the hitch assembly 10 so that the leading edge 20b of the tongue engages the depression 29a of the tongue guide member 29. This should then result in the passage 20a in the tongue aligning with the passage 28a in the lower plate 26. At this point, the user may then place his boot on the tread of the pad 32 (which is shown in a roughened condition to enhance the grip between the pad and the tread of the boot) and exert a downward force therewith to actuate the assembly to the engaged position, thus causing the engaging pin to move from the disengaged position to the engaged position, by passing first through the passage 20a in the tongue and then through passage 28a in plate 28. The user then uses the same procedure as above mentioned to release the tongue, by placing his foot beneath the pad 32 until making contact with the kick plate 34, at which point the user exerts an upward force on the pad 32 to displace the rod upwardly, causing the ring 46 to approach the housing 42a of the locking arrangement mechanism 42.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A hitch assembly for joining one article with another, comprising a support portion for attachment to one article, an engaging pin and an actuating portion movably mounted in the support portion along spaced substantially parallel axes, the engaging pin being movable between disengaged and engaged positions, wherein in the engaged position, the engaging pin is operable to engage a passage in a tongue on the other article, the actuating portion including an elongate member, the support portion including a pair of plate members each with a pair of corresponding passages, each passage in one plate member aligning with a passage in the other plate member, enabling each of the engaging pin and the elongate member to be slidably mounted in a corresponding passage in each plate member.

2. An assembly as defined in claim 1 wherein one or more of the articles is a vehicle.

3. An assembly as defined in claim 2 wherein the actuating portion is arranged to be laterally spaced from the actuating pin relative to a longitudinal axis of the vehicle.

4. An assembly as defined in claim 1 wherein the support portion includes a support plate and the parallel axes are equally spaced relative to the support plate.

5. An assembly as defined in claim 1 wherein the actuating portion further comprises a user-engaging formation.

6. An assembly as defined in claim 5 wherein the user-engaging formation is located adjacent a ground surface for allowing foot-engaged contact by the user.

7. An assembly as defined in claim 6 wherein the user-engaging formation includes a pad mounted on the lower end of the elongate member.

8. An assembly as defined in claim 1 further comprising a locking arrangement for releasably locking one or both of the actuating portion and the engaging pin in the disengaged and/or engaged positions.

9. An assembly as defined in claim 8 wherein the locking arrangement includes a latch formation on the support portion for engaging a recess formation in the actuating portion.

10. An assembly as defined in claim 9 wherein the locking arrangement includes a sleeve mounted on the support portion and slidably engaged with an outer surface of the actuating portion.

11. An assembly as defined in claim 10 wherein the latching formation includes a spring biased ball.

12. An assembly as defined in claim 11 wherein the recess formation is a groove on the actuating portion.

13. An assembly as defined in claim 1 wherein the engaging pin is biased towards the engaging position.

14. A hitch assembly for joining one article with another, comprising a support portion for attachment to one article, an engaging pin and an actuating portion movably mounted in the support portion along spaced substantially parallel axes, the engaging pin being movable between disengaged and engaged positions, wherein in the engaged position, the engaging pin is operable to engage a passage in a tongue on the other article, a locking arrangement for releasably locking one or both of the actuating portion and the engaging pin so as to lock the engaging pin in the disengaged and/or engaged positions, wherein the locking arrangement includes a latch formation on the support portion for engaging a recess formation in the actuating portion, the locking arrangement including a sleeve mounted on the support portion and slidably engaged with an outer surface of the actuating portion, the latching formation including a spring biased ball, the engaging pin being biased by gravity, or by a spring or both.

15. A hitch assembly comprising a hitch pin for a mated coupling with a tongue; an actuating portion for adjusting the pin between disengaged and engaged positions with the tongue; and support means for supporting the hitch pin and the actuating portion for movement of the hitch pin and actuation portion along respective spaced substantially parallel axes, the hitch pin being movable between disengaged and engaged positions, wherein in the engaged position, the hitch pin is operable to engage a passage in a tongue, the actuating portion including a user-engaging formation, the user engaging formation being located adjacent a ground surface for allowing foot-engaged contact by the user the user-engaging formation including a pad mounted on the lower end of the elongate member.

16. A transport vehicle, comprising an undercarriage capable of transporting articles from one location to another and equipped with a hitch assembly capable of joining the undercarriage with an adjacent vehicle, the hitch assembly comprising a support portion mounted on the undercarriage, an engaging pin and an actuating portion movably mounted in the support portion along spaced substantially parallel axes, the engaging pin being movable between disengaged and engaged positions, wherein in the engaged position, the engaging pin is operable to engage a passage in a tongue on the adjacent towed vehicle, the actuating portion including an elongate member, the support portion including a pair of plate members each with a pair of corresponding passages, wherein each passage in one plate member aligns with a passage in the other plate member, enabling each of the engaging pin and the elongate member to be slidably mounted in a corresponding passage in each plate member, the actuating portion including a user-engaging formation, the user-engaging formation being located adjacent a ground surface for allowing foot-engaged contact by the user.

17. A vehicle as defined in claim 16 wherein user-engaging formation includes a pad mounted on the lower end of the elongate member.

18. A vehicle as defined in claim 16 further comprising a locking arrangement for releasably locking one or both of the actuating portion and the pin, so as to lock the engaging pin in the disengaged and/or engaged positions, the locking arrangement including a latch formation on the support portion for engaging a recess formation in the actuating portion, the locking arrangement including a sleeve mounted on the support portion and slidably engaged with an outer surface of the actuating portion.

19. A vehicle as defined in claim 16 wherein the undercarriage includes a bumper defining an outer peripheral limit of the undercarriage, wherein the hitch assembly is confined to a region within the peripheral limit.

20. A transport vehicle, comprising an undercarriage capable of transporting articles from one location to another and equipped with a hitch assembly capable of joining the undercarriage with an adjacent vehicle, the hitch assembly comprising a support portion mounted on the undercarriage, an engaging pin and an actuating portion movably mounted in the support portion along spaced substantially parallel axes, the engaging pin being movable between disengaged and engaged positions, wherein in the engaged position, the engaging pin is operable to engage a passage in a tongue on the adjacent towed vehicle, a locking arrangement for releasably locking one or both of the actuating portion and the engaging pin for locking the engaging in the disengaged and/or engaged positions, the locking arrangement further including a latch formation on the support portion for engaging a recess formation in the actuating portion, the locking arrangement includes a sleeve mounted on the support portion and slidably engaged with an outer surface of the actuating portion, the latching formation including a spring biased ball and the recess formation is a groove on the actuating portion.

21. A vehicle as defined in claim 20 wherein the engaging pin is biased towards the engaging position.

22. A vehicle as defined in claim 20 wherein the engaging pin is biased by gravity, or by a spring or both.

23. A method of attaching a vehicle to an adjacent article, comprising:
  a step for providing a support portion on the vehicle, the support portion including a pair of plate members each with a pair of corresponding passages, each passage in one plate member aligning with a passage in the other plate member;
  a step for supporting on the support portion, an engaging pin for engaging the article by slidably mounting the engaging pin in a first corresponding passage in each plate member;
  a step for movably mounting on the support portion, an actuating portion by slidably mounting the actuating portion in a second corresponding passage in each plate member for actuating the engaging pin between engaged and disengaged positions;
  a step for orienting each of the first and second passages in the plate members so that the actuating portion and engaging portion have substantially parallel axes of travel, and wherein in the engaged position, the engaging pin is operable to engage a passage in a tongue on the article.

24. A method as defined in claim 23, further comprising a step for providing the actuating portion with a user-engaging formation.

25. A method as defined in claim 24, further comprising a step for locating the user-engaging formation adjacent a ground surface for allowing foot-engaged contact by the user.

26. A method as defined in claim 25 further comprising a step for releasably locking one or both of the actuating portion and the actuating engaging pin so that the engaging pin is locked in the disengaged and/or engaged positions.

27. A hitch assembly for a vehicle, comprising a support means, engaging pin means and actuating means movably mounted in the support means along spaced substantially parallel axes, the engaging pin means being movable between disengaged and engaged positions, wherein in the engaged position, the engaging pin means is operable to engage a passage in a tongue means on an adjacent article, the actuating means including an elongate member, the support means including a pair of plate members each with a pair of corresponding passages, each passage in one plate member aligning with a passage in the other plate member, enabling each of the engaging pin means and the elongate member to be slidably mounted in one passage in each plate member.

28. A method of attaching a vehicle to an adjacent article, comprising:
  providing a support portion on the vehicle, the support portion including a pair of plate members each with a pair of corresponding passages, each passage in one plate member aligning with a passage in the other plate member;
  supporting an engaging pin on the support portion for engaging the article by slidably mounting the engaging pin in a first corresponding passage in each plate member;
  movably mounting an actuating portion on the support portion by slidably mounting the actuating portion in a second corresponding passage in each plate member for actuating the engaging pin between engaged and disengaged positions;
  orienting each of the first and second passages in the plate members so that the actuating portion and engaging portion have substantially parallel axes of travel, and wherein in the engaged position, the engaging pin is operable to engage a passage in a tongue on the article.

29. A method as defined in claim 28, further comprising providing the actuating portion with a user-engaging formation.

30. A method as defined in claim 29, further comprising locating the user-engaging formation adjacent a ground surface for allowing foot-engaged contact by the user.

31. A method as defined in claim 30 further comprising releasably locking one or both of the actuating portion and the actuating engaging pin so that the engaging pin is locked in the disengaged and/or engaged positions.

* * * * *